United States Patent
Benedikt et al.

[11] Patent Number: 6,055,955
[45] Date of Patent: May 2, 2000

[54] INTERNAL COMBUSTION ENGINE

[75] Inventors: Walter Benedikt, Kornwestheim; Werner Herden, Gerlingen; Matthias Kuesell, Kornwestheim, all of Germany

[73] Assignee: Robert Bosch GmbH, Stuttgart, Germany

[21] Appl. No.: 09/068,720

[22] PCT Filed: Aug. 9, 1997

[86] PCT No.: PCT/DE97/01699

§ 371 Date: May 18, 1998

§ 102(e) Date: May 18, 1998

[87] PCT Pub. No.: WO98/12426

PCT Pub. Date: Mar. 26, 1998

[30] Foreign Application Priority Data

Sep. 18, 1996 [DE] Germany .......................... 196 38 024

[51] Int. Cl.[7] .............................. F02B 19/10; F02B 17/00
[52] U.S. Cl. ........................... 123/259; 123/295; 123/285
[58] Field of Search .................................... 123/295, 305, 123/259, 260, 261, 263, 266, 267, 268, 269, 285, 299, 300, 276, 281

[56] References Cited

U.S. PATENT DOCUMENTS

| | | | |
|---|---|---|---|
| 3,999,532 | 12/1976 | Kornhauser | 123/32 SP |
| 5,211,145 | 5/1993 | Ichikawa et al. | 123/295 |
| 5,237,972 | 8/1993 | Groff et al. | 123/257 |
| 5,335,635 | 8/1994 | Kadoi et al. | 123/295 |
| 5,555,867 | 9/1996 | Freen | 123/260 |
| 5,605,127 | 2/1997 | Yoshihara et al. | 123/299 |
| 5,699,766 | 12/1997 | Saito | 123/257 |

*Primary Examiner*—Andrew M. Dolinar
*Assistant Examiner*—Mahmoud M. Gimie
*Attorney, Agent, or Firm*—Edwin E. Greigg; Ronald E. Greigg

[57] ABSTRACT

An internal combustion engine, for motor vehicles having a direct fuel injection and externally supplied ignition, which has at least one combustion chamber enclosed between a cylinder head and a reciprocating piston displaceable in a cylinder bore, the combustion chamber being closable by at least one inlet valve for air aspiration. To attain extensive homogeneity of the mixture formation in direct fuel injection that assures reliable, thorough combustion of the mixture, the combustion chamber is preceded at its upper end by a chamber, which opens toward the combustion chamber and has an inside cross section that is substantially smaller than the combustion chamber and increases steadily toward the combustion chamber. The injection and ignition take place in the chamber.

19 Claims, 3 Drawing Sheets

INTERNAL COMBUSTION ENGINE

The invention is based on an internal combustion engine, particularly for motor vehicles, with direct fuel injection and externally supplied ignition.

In such internal combustion engines, the goal of direct fuel injection, that is, the injection of fuel directly into the combustion chamber and the aspiration of pure air via the inlet valve, has the goal of achieving a major reduction in fuel consumption by unthrottling in idling and at least lower partial load. To that end, it is necessary to achieve a charge stratification in the combustion chamber comprising on the one hand a homogeneous, readily ignitable and thoroughly combustible fuel-air mixture, and on the other as pure air as possible. Direct injection systems until now, however, cause major unsteady, location-dependent mixture formation in the combustion chamber.

In order to counteract the problem of nonhomogeneity within the mixture cloud, a changeover has been made in a known internal combustion engine to inject a fuel-air mixture into the combustion chamber (German Patent Disclosure DE 39 20 089 A1). An injection nozzle for a fuel-air mixture and an associated spark plug, which are disposed in the cylinder head, are oriented toward one another in such a way that the injection nozzle is aimed at the free space between the two ignition electrodes of the spark plug, protruding into the combustion chamber, where the ignition sparks occur, and the center of the combustion chamber is located downstream of the electrodes in terms of the injection direction of the injection nozzle.

ADVANTAGES OF THE INVENTION

The internal combustion engine of the invention has the advantage that while maintaining direct injection of pure fuel, extensive homogeneity of the mixture formation until ignition is attained, thus assuring more-reliable, thorough combustion. The result is an especially favorable behavior at the transition from idling to partial load and from partial load to full load. At the same time, there are advantages, especially the overcoming of problems in flame core formation, in homogenous lean operation, or in operation with exhaust gas recirculation.

In a preferred embodiment of the invention, the chamber is embodied as bell-shaped and its volume amounts to approximately 30 to 50% of the minimum combustion chamber volume present at top dead center of the reciprocating piston. As a result, it is attained that beginning at idling, as the load increases, a volumetric region of the chamber that grows steadily in the direction of the top of the bell is filled with a homogeneous, combustible mixture.

In an advantageous embodiment of the invention, a virtually symmetrical depression is formed in the middle of the end wall of the reciprocating piston that defines the combustion chamber, and this depression, together with the combustion chamber, adds to the bell shape of the chamber to make a pear shape. By means of this depression, between the end faces, facing one another, of the reciprocating piston and the cylinder wall, squish gaps form in the upward motion of the reciprocating piston from its bottom dead center to its top dead center, and through them air flows into the chamber in a defined way and reinforces the mixture preparation.

In a further embodiment of the invention, the fuel injection is controlled such that a fuel-air mixture formation takes place in the chamber at idling and lower partial load, and in the chamber and the combustion chamber at upper partial load and full load. Because of this definition of an injection time slot, the mixture homogeneity can be varied up until the instant of ignition, and the mixture formation can be controlled in such a way that it takes place either in the chamber or in the chamber and the combustion chamber, and there either a charge stratification or a homogeneous mixture formation is attained. This injection time slot, like the instant of ignition, can be controlled as a function of the engine load and rpm by means of a performance graph or can be regulated via "feedback" from the combustion chamber by means of combustion chamber pressure sensors.

In a preferred embodiment of the invention, the control of the injection time slot is preferably done in such a way that at idling and lower partial load a correspondingly small fuel quantity is injected if the reciprocating piston is located approximately at bottom dead center, and that at upper partial load and full load a correspondingly large fuel quantity is injected when the reciprocating piston is moved downward out of its top dead center in the intake stroke. By means of the chamber provided according to the invention, a charge stratification is then attained at idling and lower partial load that on the one hand enables homogeneity of the mixture formation over approximately 180° of crankshaft angle and on the other prevents extensive mixing of the fuel with the remaining air in the combustion chamber. At upper partial load and full load, conversely, the fuel from the chamber mixes with the contents of the combustion chamber over a crankshaft angle of 360° and by the instant of ignition is largely homogeneously mixed.

This performance is reinforced if in accordance with a further embodiment of the invention, the injection nozzle is embodied controllably in terms of the reach and/or cross section of its injection stream. At idling and lower partial load, a short reach and a wide cross section and at upper partial load and full load a long reach and a narrow cross section of the injection stream is set.

In an advantageous feature of the invention, the injection nozzle and spark plug required for the fuel injection and ignition, the latter having ignition electrodes that are disposed in the cylinder head, are disposed relative to one another in such a way that the spark plug ignition electrodes protruding into the chamber are located outside the injection stream of the injection nozzle. As a result, the spark plug is not sprayed on during the fuel injection, and so there is no thermal shock to the ceramic and electrodes of the spark plug, nor do any deposits form on the ceramic. This increases the service life of the spark plug.

In accordance with alternative embodiments of the invention, the spark plug and the injection nozzle can be combined into one structural unit, which is inserted interchangeably into the cylinder head, or inserted separately in intended bores in the cylinder head. The disposition of the spark plug and injection nozzle can be done biaxially or coaxially; in the case of the coaxial arrangement, the injection opening of the injection nozzle is located centrally.

BRIEF DESCRIPTION OF THE DRAWINGS

The invention will be described in further detail in the ensuing description in terms of exemplary embodiments shown in the drawing. The drawings schematically show the following.

DESCRIPTION OF THE EXEMPLARY EMBODIMENTS

Figure 1:
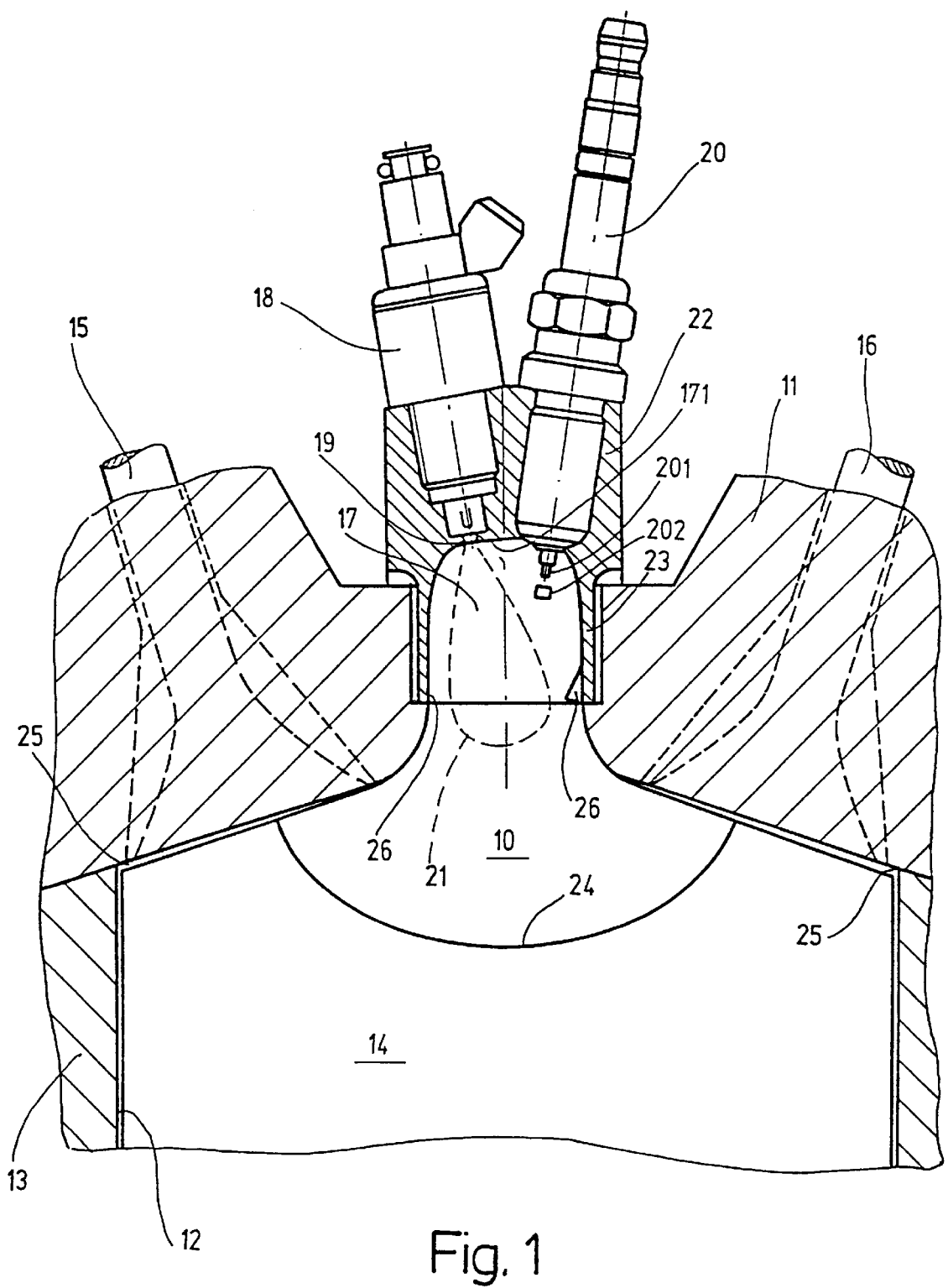
FIG. 1, in fragmentary form, a longitudinal section of an engine block of an internal combustion engine with direct fuel injection and externally supplied ignition.

The internal combustion engine for motor vehicles with direct fuel injection and externally supplied ignition, shown in fragmentary form in longitudinal section in FIG. 1, has a combustion chamber 10, which is enclosed between a cylinder head 11 and a reciprocating piston 14 that is displaceable in a cylinder bore 12 of an engine block 13. During engine operation, the reciprocating piston 14 executes an up and down motion in the cylinder bore 12 between a bottom dead center and a top dead center and is connected to a crankshaft, not shown here, via a connecting rod, also not shown. At least one inlet valve 15 and at least one outlet valve 16 for controlling the gas exchange of the engine are provided in the cylinder head 11. The inlet valve 15 communicates with an air intake tube, while the outlet valve 16 is connected to the exhaust system. The combustion chamber 10 is preceded by a chamber 17 that is machined axially symmetrically into the cylinder head 11. The inside cross section of the chamber 17 disposed centrally between the valves 15, 16 is substantially smaller than that of the cylinder bore 12 and increases steadily toward the combustion chamber 10. Preferably, the chamber 17 is bell-shaped, which assures that the inside cross section will increase continuously from the top 171 of the bell toward the mouth of the bell.

In the cylinder head 11, an electromagnetically controlled injection nozzle 18 is inserted for fuel injection in such a way that its injection opening 19 discharges into the top 171 of the bell forming the chamber 17. A spark plug 20 is also inserted into the cylinder head 11 in such a way that both of its ignition electrodes 201 and 202 protrude into the chamber 17. The injection nozzle 18 and the spark plug 19 are disposed biaxially, with the axes inclined relative to one another such that the two ignition electrodes 201 and 202 are located outside the injection stream 21 injected by the injection nozzle 18 into the chamber 17. In order to assure a correct alignment of the axes of the injection nozzle 18 and the spark plug 20, the two are combined with a screw-in head 22 to form a structural unit and can be changed only jointly, by screwing the screw-in head 22 into or unscrewing it from a corresponding threaded bore 23 in the cylinder head 11. The volume of the bell-shaped chamber 17 is approximately 30 to 50% of the minimum combustion chamber volume present at top dead center of the reciprocating piston 14. This bell-shaped chamber volume is supplemented by a depression 24, made virtually symmetrically in the end wall of the reciprocating piston 10, to make a pear shape.

In the upward motion of the reciprocating piston 14 from its bottom dead center to its top dead center, the latter shown in FIG. 1, squish gaps 25 form between the opposed end faces of the reciprocating piston 14 and the cylinder head 11, through which gaps air flows in a defined way into the chamber 17 and reinforces the mixture preparation. The mixture preparation is improved by turbulence edges 26 disposed in the chamber 17, which increase the intensity of the turbulence.

During engine operation, by means of the injection nozzle 18, a control device, not shown here, creates an injection time slot, which controls whether the mixture formation is effected only in the chamber 17 with charge stratification, which is desired for idling and lower partial load, or in the entire combustion chamber 10 with homogeneous mixture formation, which is the goal at upper partial load and full load. It is possible to select the injection time slot independently of the definition of the instant of ignition by the spark plug 20.

By means of this injection time slot, at idling and lower partial load, a correspondingly small fuel quantity is injected when the reciprocating piston 14 is approximately at bottom dead center. As already noted, the injection takes place into the chamber 17, but without spraying the spark plug 20. In the compression phase, or in other words when the reciprocating piston 14 is moving from its bottom dead center to its top dead center, the aspirated air, made turbulent, flows into the chamber 17 and forms a readily ignitable, homogeneous mixture solely inside the chamber 17.

At higher loads and at full load, a correspondingly large fuel quantity is already injected in the aspiration phase, or in other words when the reciprocating piston 14 is moving downward, so that the fuel out of the chamber 17 mixes with the contents of the combustion chamber over a crankshaft angle of about 360°, largely homogeneously, by the instant of ignition. In homogeneous lean operation or in operation with exhaust gas recirculation, a slight quantity of fuel is additionally reinjected in the region of bottom dead center of the reciprocating piston 14, so that at the instant of ignition an approximately stoichiometric mixture will be present in the chamber 17. As a result, a weak stratification of readily ignitable mixture in the chamber 17 and a very lean mixture in the combustion chamber 10 can be attained, with the advantage that the drawn-out, high-energy flame front in the chamber 17 can reliably ignite the lean mixture in the combustion chamber 10.

It is helpful if in addition the injection nozzle 18 is embodied controllably in terms of the reach and/or cross section of its injection stream 21. At idling and lower partial load, a short reach and a wide cross section and at upper partial load and full load a long reach and a narrow cross section of the injection stream 21 would be set.

Figure 2:
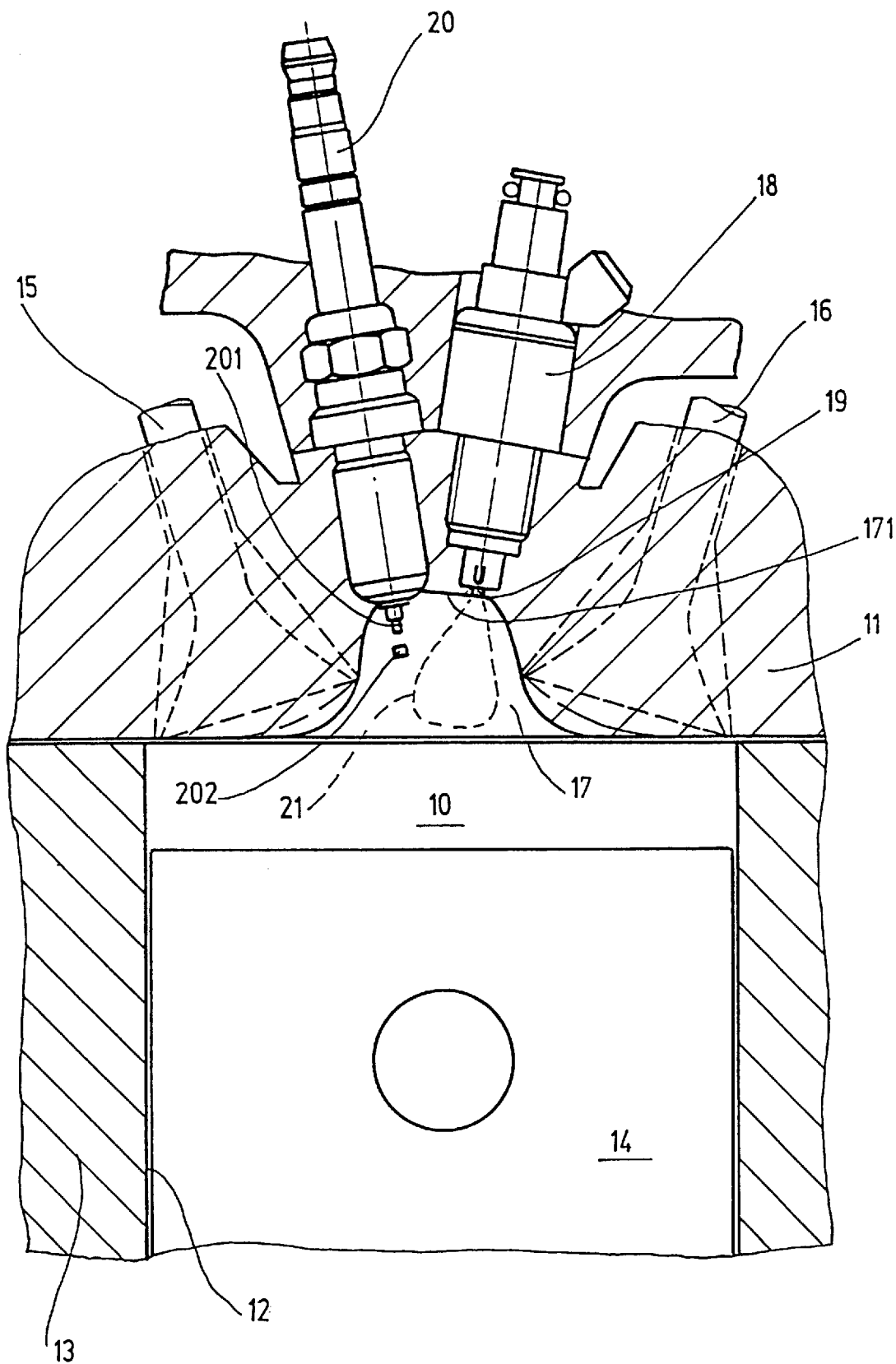
FIGS. 2 and 3, a view identical to FIG. 1, for a second and third exemplary embodiment, respectively.

The internal combustion engine shown in fragmentary longitudinal section in FIG. 2 is only slightly modified over the engine described above. Here, the injection nozzle 18 and spark plug 20 are not combined into a mounting unit but instead are inserted separately into the cylinder head 11. Moreover, the reciprocating piston 14 has a flat end face, oriented perpendicular to the displacement motion, for defining the combustion chamber 10, and no depression is embodied in its end wall that defines the combustion chamber 10. Otherwise, the construction and mode of operation are like those of the engine described in conjunction with FIG. 1.

Figure 3:
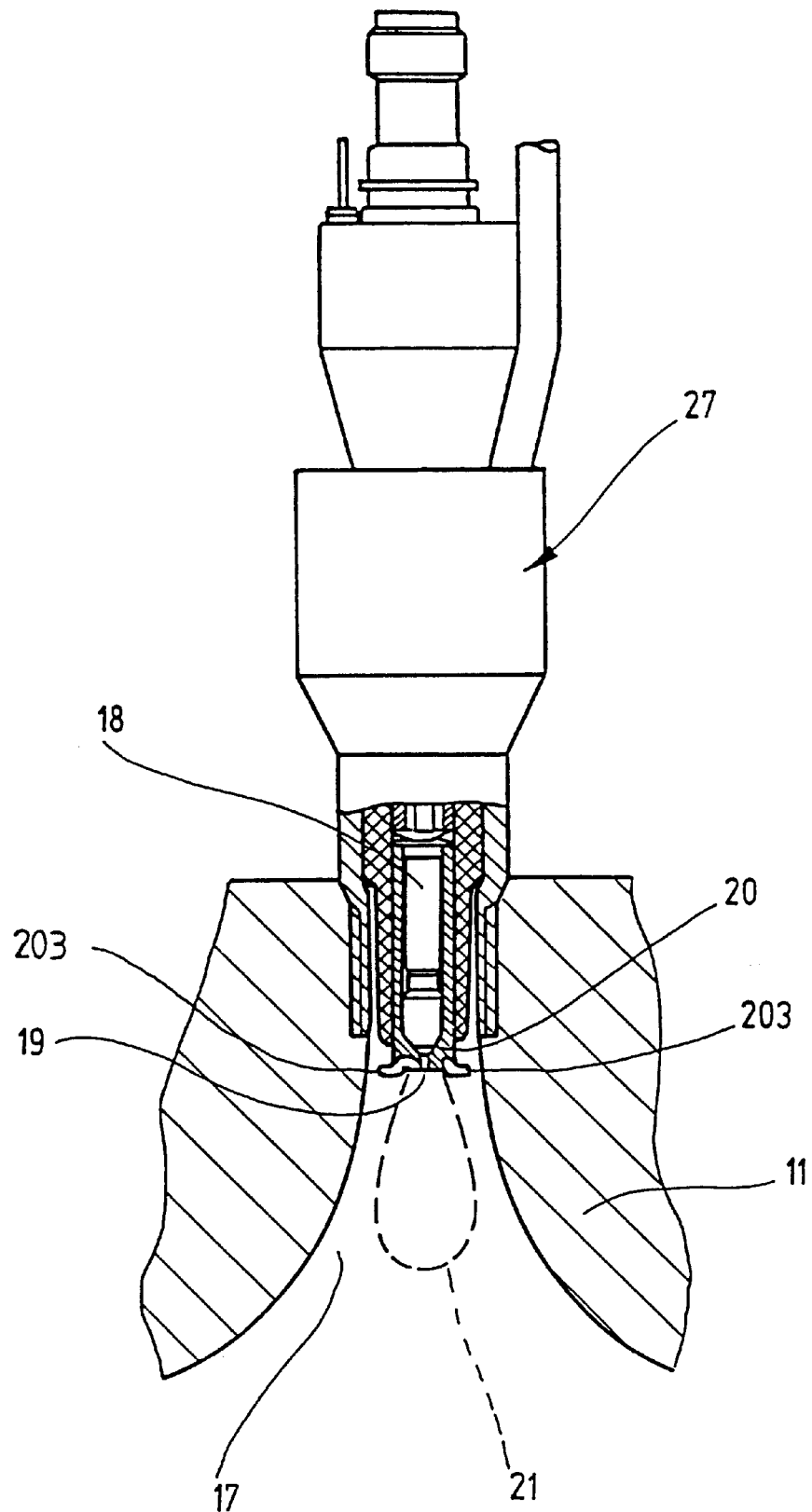

The internal combustion engine of FIG. 3, shown in a fragmentary, partly cutaway view, now clearly shows that the injection nozzle 18 and spark plug 20 can be disposed coaxially, thus forming a structural unit. The injection opening 19 of the injection nozzle 18 is disposed centrally, and the spark plug 20 has only center electrodes 203. The ignition takes place toward the wall of the chamber 17 and thus once again outside the injection stream 21 originating at the central injection opening 19.

The foregoing relates to preferred exemplary embodiments of the invention, it being understood that other variants and embodiments thereof are possible within the spirit and scope of the invention, the latter being defined by the appended claims.

We claim:

1. An internal combustion engine, for motor vehicles, comprising a direct fuel injection and externally supplied ignition, at least one combustion chamber (10) enclosed between a cylinder head (11) and a reciprocating piston (14) displaceable in a cylinder bore (12), the combustion chamber being closable by at least one inlet valve (15) for air aspiration, the combustion chamber (10) is preceded at an upper end by a chamber (10), which opens toward the combustion chamber (10) and has an inside cross section that is substantially smaller than the combustion chamber (10), and that the injection and ignition take place in the chamber (17), and turbulence edges (26) are provided in the chamber 17 for making fuel and air turbulent.

2. An internal combustion engine in accordance with claim 14, in which the chamber (17) is embodied as bell-shaped and its volume amounts to approximately 30 to 50% of the minimum combustion chamber volume present at top dead center of the reciprocating piston (14).

3. An internal combustion engine in accordance with claim 1, in which the chamber (17) is embodied in the cylinder head (11).

4. An internal combustion engine in accordance with claim 1, in which a virtually symmetrical depression (24) is formed in the middle of the end wall of the reciprocating piston (14) that defines the combustion chamber (10), and this depression, together with the combustion chamber (10), adds to the bell shape of the chamber (17) to make a pear shape.

5. An internal combustion engine in accordance with claim 1, in which the fuel injection is controlled such that a fuel-air mixture formation takes place in the chamber (17) at idling and lower partial load, and in the chamber (17) and the combustion chamber (10) at upper partial load and full load.

6. An internal combustion engine in accordance with claim 5, in which at idling and lower partial load a correspondingly small fuel quantity is injected if the reciprocating piston (10) is located approximately at bottom dead center, and that at upper partial load and full load a correspondingly large fuel quantity is injected when the reciprocating piston (14) is moved downward out of its top dead center in the intake stroke.

7. An internal combustion engine in accordance with claim 6, in which in a homogeneous lean operating mode or in operation with exhaust gas recirculation at upper partial load and full load, a further small fuel quantity is injected when the reciprocating piston (14) is located at approximately its bottom dead center.

8. An internal combustion engine in accordance with claim 1, which includes an injection nozzle (18) for the fuel injection and a spark plug (20) with an ignition electrode (201, 202) for the ignition, the injection nozzle and the spark plug being disposed in the cylinder head (11), the spark plug (20) and the injection nozzle (18) are oriented such that the ignition electrodes (201, 202) protruding into the chamber (17) are located outside the injection stream (21) of the injection nozzle (18).

9. An internal combustion engine in accordance with claim 3, which includes an injection nozzle (18) for the fuel injection and a spark plug (20) with an ignition electrode (201, 202) for the ignition, the injection nozzle and the spark plug being disposed in the cylinder head (11), the spark plug (20) and the injection nozzle (18) are oriented such that the ignition electrodes (201, 202) protruding into the chamber (17) are located outside the injection stream (21) of the injection nozzle (18).

10. An internal combustion engine in accordance with claim 8, in which the spark plug (20) and the injection nozzle (18) are combined into one structural unit (22), which is inserted interchangeably into the cylinder head (11).

11. An internal combustion engine in accordance with claim 8, in which the spark plug (20) and the injection nozzle (18) are disposed biaxially or coaxially.

12. An internal combustion engine in accordance with claim 10, in which the spark plug (20) and the injection nozzle (18) are disposed biaxially or coaxially.

13. An internal combustion engine in accordance with claim 11, in which if the spark plug (20) and injection nozzle (18) are disposed coaxially, the injection opening (19) of the injection nozzle (18) is disposed centrally.

14. An internal combustion engine in accordance with claim 1, in which the injection nozzle (18) is embodied controllably in terms of a reach and cross section of its injection stream (21), and that at idling and lower partial load, a short reach and a wide cross section and at upper partial load and full load a long reach and a narrow cross section of the injection stream (21) is set.

15. An internal combustion engine, for motor vehicles, comprising a direct fuel injection and externally supplied ignition, at least one combustion chamber (10) enclosed between a cylinder head (11) and a reciprocating piston (14) displaceable in a cylinder bore (12), the combustion chamber being closable by at least one inlet valve (15) for air aspiration, the combustion chamber (10) is preceded at an upper end by a bell-shaped chamber (17), which opens toward the combustion chamber (10) and has an inside cross section that is substantially smaller than the combustion chamber (10), and that the injection and ignition take place in the bell-shaped chamber (17), the bell-shaped chamber (17) has a volume which amounts to approximately 30 to 50% of the minimum combustion chamber volume present at top dead center of the reciprocating piston (14), and turbulence edges are provided in the bell-shaped chamber 17 for making fuel and air turbulent.

16. An internal combustion engine in accordance with claim 15, in which the chamber (17) is embodied in the cylinder head (11).

17. An internal combustion engine in accordance with claim 15, in which a virtually symmetrical depression (24) is formed in the middle of the end wall of the reciprocating piston (14) that defines the combustion chamber (10), and this depression, together with the combustion chamber (10), adds to the bell shape of the chamber (17) to make a pear shape.

18. An internal combustion engine in accordance with claim 15, in which the fuel injection is controlled such that a fuel-air mixture formation takes place in the chamber (17) at idling and lower partial load, and in the chamber (17) and the combustion chamber (10) at upper partial load and full load.

19. An internal combustion engine in accordance with claim 15, which includes an injection nozzle (18) for the fuel injection and a spark plug (20) with an ignition electrode (201, 202) for the ignition, the injection nozzle and the spark plug being disposed in the cylinder head (11), the spark plug (20) and the injection nozzle (18) are oriented such that the ignition electrodes (201, 202) protruding into the chamber (17) are located outside the injection stream (21) of the injection nozzle (18).

* * * * *